May 3, 1966
M. K. PRICE ETAL
3,249,814
SERIES CAPACITOR SYSTEM WITH SEQUENTIALLY COORDINATED
DUAL SPARK GAP PROTECTION
Filed Nov. 19, 1963
2 Sheets-Sheet 1
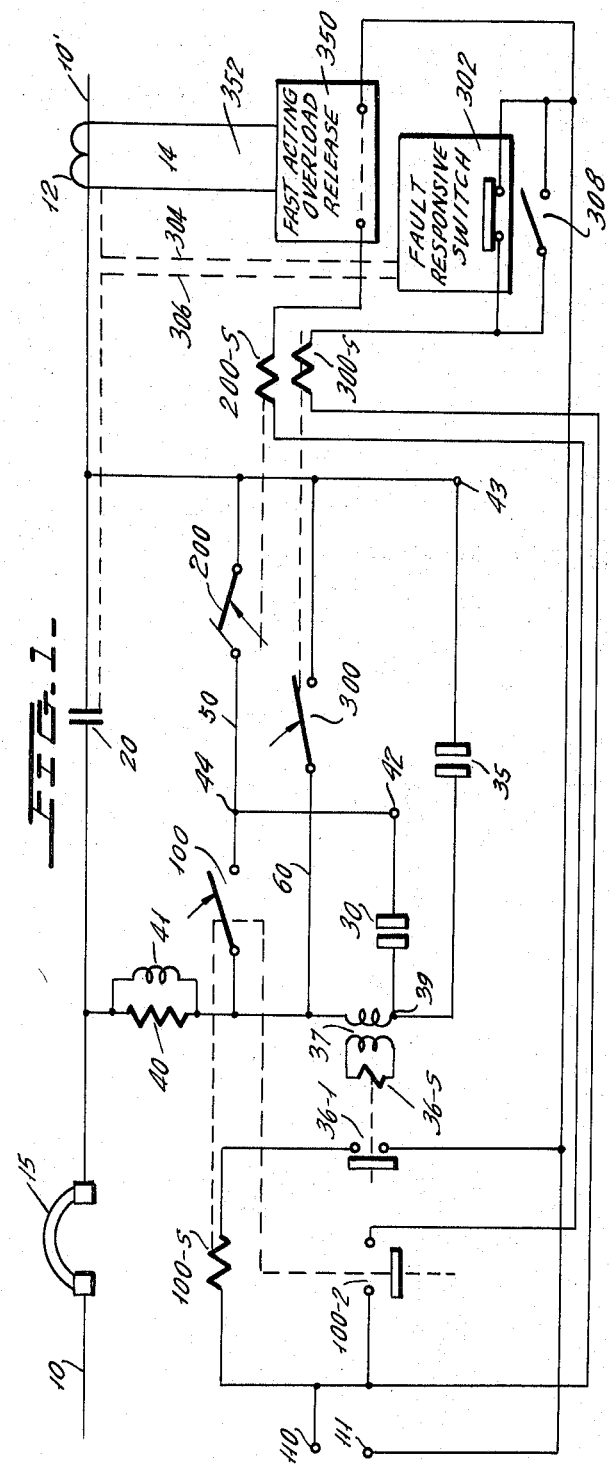
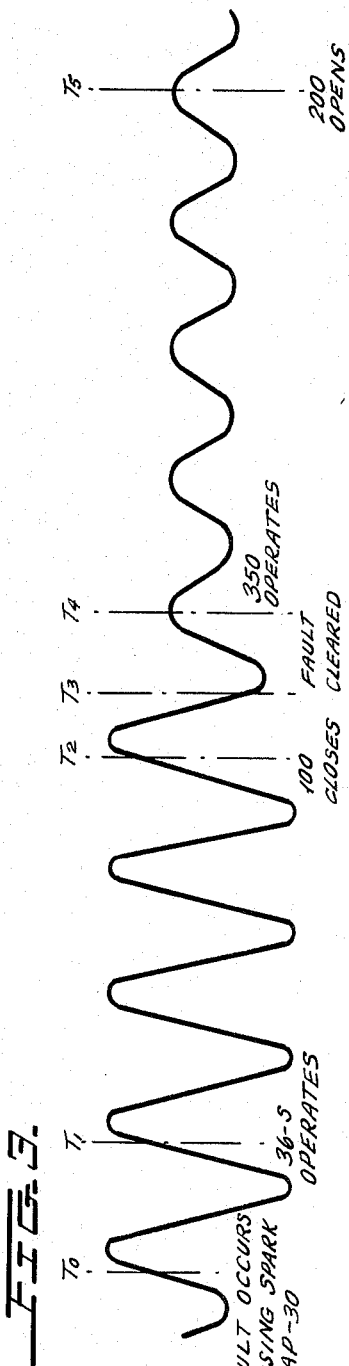
INVENTORS
DAVID W. GARDNER
MURRAY K. PRICE
BY OSTROLENK, FABER, GERB & SOFFEN-ATTORNEYS

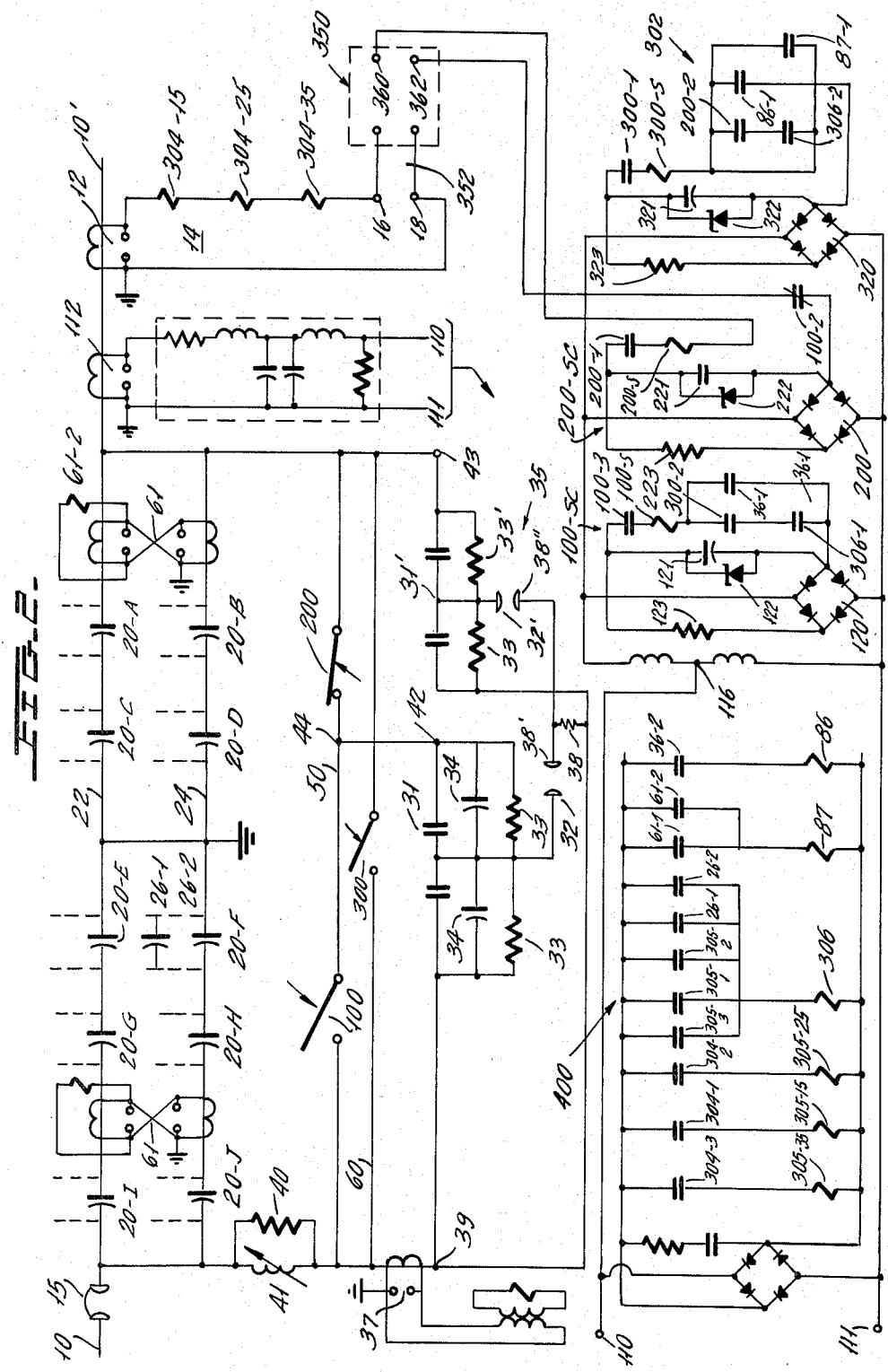

United States Patent Office 3,249,814
Patented May 3, 1966

3,249,814
SERIES CAPACITOR SYSTEM WITH SEQUENTIALLY COORDINATED DUAL SPARK GAP PROTECTION
Murray K. Price, Downsview, Ontario, and David W. Gardner, Willowdale, Ontario, Canada, assignors to I-T-E Circuit Breaker (Canada) Limited, Port Credit, Ontario, Canada, a limited-liability company of Canada
Filed Nov. 19, 1963, Ser. No. 324,758
14 Claims. (Cl. 317—12)

Our invention relates to a protective arrangement for a series capacitor bank in a high voltage alternating current transmission line, and more particularly to a protective arrangement of the general type shown in copending U.S. patent application Serial No. 259,238, filed February 18, 1963, entitled, "Rapid Reinsertion Protection System for Series Capacitor Bank," in the names of Murray K. Price and Brian J. Gilson, and assigned to the assignee of the instant invention; but wherein upon reinsertion of the capacitor bank, protection is afforded by a secondary spark gap, other than the main spark gap which initially operates to remove the capacitor bank from the line. Preferably the sequential employment of a main and secondary spark gap completely avoids the need for a source of compressed air at the remotely located installation site; such source being previously necessary to clean out the ionized gases from the spark gap so as to prevent a restrike of the arc under normal operating conditions.

Series capacitor banks are used in alternating current power transmission lines to improve system operation by neutralizing the line reactance. That is, the power transmission lines themselves are known to be inductive. The existence of such line inductance disadvantageously affects the power factor, transport capacity, stability and voltage regulation of the line. This condition is especially severe in the long distance, extra-high voltage (as for example, 230 kv. lines) which are currently coming into more frequent use.

To balance out the inductive reactance of the line, it is known to insert capacitors in series along the line of a sufficient magnitude to compensate for all or part of the line reactance. The voltage appearing across such series capacitors will be directly proportional to load current, therefore subjecting a non-protected series capacitor unit to an excessive voltage during the occurrence of a line fault condition. Although such capacitor units are capable of withstanding moderate overloads for brief periods, they will be subjected to the possibility of serious damage should the line current exceed its normal value by an extensive amount, i.e., 2½ times line current, even momentarily.

The volume and price of a capacitor generally increases with the square of its maximum current rating. It is therefore economically undesirable to use series capacitors rated greatly in excess of normal line currents. Accordingly, it has become the practice to use a bank of capacitors rated at substantially normal loads, and to provide a rapid bypassing arrangement for the capacitor bank responsive to the presence of excessive fault conditions. The bypass circuit preferably operates almost instantaneously upon the occurrence of a fault in excess of a predetermined level. Such instantaneous operation may be obtained, for example, by an appropriately designed main spark gap device in shunt relationship with the capacitor bank.

During the period in which the series capacitor bank is bypassed from the series line, it is effectively removed from aiding to neutralize the inductive reactance of the line. Since the system stability provided by the capacitor bank is particularly important immediately following the clearing up of the fault condition, it is essential that the protective system operate to restore the capacitor to the line as rapidly as possible after the danger of capacitor damage has been dissipated by the clearing up of the fault. Accordingly, auxiliary equipment is provided for rapidly restoring the capacitor to the line, thereby maximizing its effectiveness while still maintaining adequate protection of the capacitor bank against overload damage. Our invention relates to a protective arrangement which after extinguishing the main spark gap device and restoring the capacitor bank in series with the transmission line, utilizes a secondary spark gap to protect the capacitor system. The utilization of the secondary spark gap is system coordinated to permit a sufficient time for the ionized gases within the main spark gap to be naturally dissipated.

Numerous series capacitor protective arrangements have been previously suggested to obtain rapid restoration of the capacitor bank. One such arrangement utilizes an arc gap in the bypass circuit which is made self-clearing by means of an air blast continuously directed through the gap responsive to break-down. The air blast is of sufficient strength to deionize the area between the arc electrodes, extinguishing the arc at every current zero after the arc is struck. Such extinguishment of the arc reinserts the capacitor bank in series with the transmission line. However, since it normally takes a number of cycles for the fault to be cleared, the arc will restrike at half cycle intervals intermediate the current zeroes from the time the arc is initially extinguished to the clearing up of the fault condition. This repetitive restriking of the arc has been found to give rise to transient voltages of sufficient magnitude to harm the capacitor bank. Another disadvantage of this arrangement is the need for the availability of a substantial source of compressed air at the remotely located installation site to provide the continuous arc extinguishing blast. Such a supply of compressed air also involves frequent maintenance problems.

Another attempt which has been suggested is to interrupt the bypass circuit by various arrangements of fast operating electromagnetic relays and switches, arranged in the circuit to sense the presence or removal of the overload condition. As discussed in aforementioned copending U.S. patent application Serial No. 259,238, such systems are often times relatively slow in resetting, should normal current continue to flow in the transmission line when the overload condition is removed. A particularly preferable control system is shown in that patent application, which includes a novel bypass circuit arrangement in shunt relationship with the capacitor bank. The bypass circuit includes the series arrangement of a normally opened and normally closed fast acting switch. The normally opened, or by-pass disconnect switch, is rapidly closed responsive to the conduction of arc current. This provides a low impedance shunt path across the main spark gap and capacitor bank, to extinguish the arc while still keeping the capacitor bank out of the transmission line. The opening of the normally closed or by-pass interrupter switch is effected by the operation of a fast acting overload release, such as is the subject of copending U.S. patent application (EP-34) Serial No. 259,233, filed February 18, 1963, in the name of M. K. Price, and assigned to the assignee of the instant invention. Upon opening of the interrupter switch the capacitor bank is reinserted in the line, with the main spark gap immediately being in shunt circuit across the capacitor bank.

Should the main spark gap be shorted out for only a short time, it is quite possible that the ionized gases formed therein will not be completely dissipated at the time the capacitor bank is reinserted into the system. If so, the main spark gap will flash over at less than its rated value, resulting in bypassing of the capacitor bank under a non-fault condition. This situation had been avoided in the system disclosed in above-mentioned U.S. Patent application Serial No. 259,238 by the use of a relatively small source of compressed air; energized subsequent to the extinguishment of the arc gap to direct a short puff of air into the gap for the removal of ionized gases. The puff of air was directed into the gap at a time intermediate the closing of the disconnect switch and the opening of the interrupter switch, to prevent a restrike of the arc upon opening of the bypass circuit. The source of compressed air required for such removal of the ionized gas was of a substantially lesser magnitude than that required in the arrangements which utilize a considerable blast of compressed air to extinguish the arc. Although appreciably reducing the compressed air requirements, that system still presented a bothersome maintenance problem in conjunction with servicing and recharging such remotely located compressed air sources.

Advantageously, our invention completely avoids the need for even such a small source of compressed air, by providing the dual arrangement of a main and secondary spark gap. The main spark gap operates as before, to initially shunt out the capacitor bank responsive to a predetermined fault condition. However, its circuit relationship with respect to the bypass circuit is modified, such that upon subsequent opening of the interrupter switch, to reinsert the capacitor bank, the main spark gap is open-circuited and the secondary spark gap will be shunt operative across the capacitor bank. Further, during subsequent opening of the disconnect switch and operation of the interrupter switch to its closed position, the main spark gap will be kept out of the circuit a sufficient time to permit the ionized gases to be naturally dissipated therefrom. More specifically, the disconnect switch is directly in parallel across the main spark gap, with said parallel connection being series connected to the interrupter switch; the entire arrangement being in parallel across the capacitor bank. Thus, with the disconnect switch closed, it will shunt the main spark gap, with the opening of the interrupter switch serving to reinsert the capacitor bank, but not to defeat the shunted relationship of the main spark gap. During the latter condition, the back-up spark gap will be shunt operative across the capacitor bank, and will be so operative until such time, both (1) the bypass switch opens and (2) the interrupter switch closes, to return the system to its normal operating condition. It is, therefore, seen that the basic concept of our invention resides in the sequential utilization of main and back up spark gaps, to permit rapid capacitor bank reinsertion, without danger of premature arcing from the presence of ionized gases, and completely avoiding the need for a compressed air source.

It is, therefore, a primary object of our invention to provide an improved system for rapidly reinserting a protectively removed capacitor bank.

It is a further object of our invention to provide a series capacitor bank reinsertion system employing a novel arrangement of a main and back up spark gap.

It is another object of our invention to provide such a series capacitor bank reinsertion system, wherein the back up spark gap is operable during the reinsertion interval to permit natural dissipation of ionized gases within the previously energized main spark gap.

It is an added object of our invention to provide such a series capacitor bank reinsertion system wherein the transferring of protection between the main and back-up spark gaps is provided by the same switch means operable to remove and reinsert the capacitor bank.

Still a further object of our invention is to provide a protective arrangement for a series capacitor bank which includes the shunt circuit relationship across the capacitor bank of a main spark gap instantaneously responsive to a fault condition and a normally open bypass circuit, the bypass circuit sequentially completed to first shunt extinguish the spark gap and then opened responsive to the clearing up of the fault condition to reinsert the capacitor bank, the reinserted capacitor bank protected by a back-up spark gap in shunt circuit across the capacitor bank.

Still another object of our invention is to provide such a protection arrangement, wherein the opening of the bypass circuit to reinsert the capacitor bank will not defeat the shunt relationship of the portion of the bypass circuit across the main spark gap until sufficient time has elapsed for the dissipation of the ionized gases therein.

Still an additional object of our invention is to provide such a protection arrangement wherein the opening of the bypass circuit also serves to defeat the shunt relationship of the main spark gap across the capacitor bank.

These as well as other objects of our invention will readily become apparent from the following description of the accompanying drawings in which:

FIGURE 1 is a simplified schematic diagram illustrating the operation of a series capacitor protective arrangement constructed in accordance with our invention, as shown in conjunction with a system of the type which is in the subject of above-mentioned U.S. patent application Serial No. 259,238.

FIGURE 2 is a diagrammatic representation of a single phase of a high voltage distribution line system having a series capacitor installation in accordance with a preferred embodiment of our invention.

FIGURE 3 is a representative wave form diagram of line load during the occurrence and clearing up of an overload fault, and indicating the time sequence of operation of the rapid reinsertion system.

To facilitate an understanding of my invention, and particularly its sequential operation for rapid capacitor bank reinsertion, a discussion of an overall system of the type set forth in copending U.S. patent application Serial No. 259,238 is in order. It is to be understood that the instant invention is shown in conjunction with that system for illustrative purposes only, with its basic concepts being equally adaptable to other protective arrangements.

The figures for simplicity show only one phase of a power transmission system incorporating our rapid reinsertion protective arrangement. It is naturally understood that in actual practice three similar phases would ordinarily be employed. Also the actual three-phase system might preferably include interphase signalling means for operation of the individual phase protective circuitry in unison responsive to a fault condition in one of the phases. Such interphase signalling may, for example, take the form of motor actuated rotary columns formed of interrelated axial segments appropriately connected to the switching assemblies of the protective arrangement.

Referring to FIGURE 1 the line 10–10' is representative of one of the main transmission lines of a high voltage system, which may for example by a 230 kv. line. Series capacitor bank 20 is installed along the line for the purpose of balancing out the reactive impedance of the line, thereby improving the power factor, to effect an increase in power transport capacity of the line. Although capacitor 20 is diagrammatically shown as a single unit it normally consists of a fairly large installation including a number of individual units connected together in an appropriate series parallel arrangement to yield the necessary capacitive reactance and current rating.

Inasmuch as the interruption of a main line at the generator will cause severe power interruption, it is desirable to remove system faults by the proper operation of line breakers (not shown) situated towards the load end of the line. Accordingly, main transmission line circuit breaker 15 will usually be closed and line current will flow through capacitor bank 20. Upon the occurrence of a fault condition causing excessive currents to flow through line 10–10', capacitor bank 20 is protected from overvoltages by means of main spark gap assembly 30 connected in shunt relationship with respect to the capacitor bank 20, via normally closed interrupter switch 200. Normally opened disconnect switch 100 is directly in shunt across main spark gap 30. An auxiliary spark gap 35 is parallel connected across capacitor bank 20; and the parallel-series circuit relationship of main spark gap 30, disconnect switch 100 and interrupter switch 200. Both spark gaps 30, 35 are of an appropriate design, such as of the type shown in copending U.S. patent application (C–1116) Serial No. 234,770 entitled, "Adjustable Precision Spark Gap," filed November 1, 1962, in the name of Otto Jensen, and assigned to the assignee of the instant invention, to break down and immediately become conducting when subjected to their calibrated instantaneous fault voltage, which would otherwise subject the capacitor bank 20 to serious damage. Spark gap 30 is calibrated to respond to a slightly lower fault magnitude than spark gap 35, such that it will break down and become conductive should a fault occur during the normal operating condition, as shown in FIGURE 1.

The parallel arrangement of resistor 40 and inductor 41 is preferably connected in series with the spark gap circuit to limit the magnitude of the discharge current from capacitor bank 20 when the spark gap breaks down, and to damp out oscillations of the capacitor discharge current.

Bypass circuit 50 is provided in shunt relationship with respect to capacitor bank 20. Bypass circuit 50 includes the series relationship of normally opened switch 100 and normally closed switch 200 which serve the combined purposes of rapidly extinguishing the arc of spark gap 30, reinserting the capacitor bank 20 back into the line responsive to the clearing up of the fault condition, and transferring the protection of capacitor bank 20 from spark gap 30 to spark gap 35, in accordance with our invention. Switches 100 and 200 are suitable fast acting devices, preferably of the spring motor charged variety, trip-biased to their other position and quickly operative responsive to the energization of trip-coil solenoids 100–s and 200–s respectively. Actuating solenoid 100–s is connected to terminals 110, 111 of an appropriate energizing potential source, through the series circuit including contact pair 36–1. Contact pair 36–1 is controlled by output relay 36–s of current sensitive tap-off 37 responsive to the flow of the arc gap current. The breakdown of arc-gap 30, accompanied by the flow of arc current, energizes 36–s to close contacts 36–1 and thereby complete the energizing path of actuating solenoid 100–s to close switch 100. The closing of switch 100 completes bypass circuit 50 which by providing a lower impedance path than that of main spark gap device 30 serves to extinguish that spark gap. Also, since switch 100 is now directly in shunt across main spark gap 30, that spark gap will be shunted out until subsequent opening of switch 100.

Rapid restoration of capacitor bank 20 in series with the transmission line is provided by the subsequent opening of switch 200. Actuating solenoid 200–s is connected to energizing source terminals 110, 111 through the series circuit arrangement of fast acting overload release 350 and contacts 100–Z, the latter being auxiliary contacts closed responsive to the closing of switch 100. The fast acting overload release 350 which constitutes the subject matter of aforementioned U.S. patent application, Serial No. 259,233 includes an input 352 connected to line current pick-off device 12 to be rapidly responsive to the clearing up of the overload condition. Hence, it is quite possible that the capacitor bank is reinserted before the ionized gases may be naturally dissipated from main spark gap 30 to avoid a restrike of the arc under a non-overload condition. Should this be the case, we advantageously provide the secondary, or back-up, spark gap 35 which will be in shunt circuit operation across the capacitor bank 20, upon the reinsertion thereof responsive to the opening of switch 200. Also, the opening of switch 200 will open-circuit the shunt relationship of main spark gap 30 across capacitor bank 20, should switch 100 be subsequently opened. That is, during the resetting cycle, switch 200 begins to close and 100 to open. Our system advantageously keeps main spark gap 30 out of operation until such time as both switch 200 has completely closed and switch 100 opened, thereby insuring adequate time for the ionized gases to be dissipated therefrom.

The protective arrangement also contemplates a lockout series circuit 60 in shunt relationship with the capacitor bank 20 and protective shunt circuits 30 and 50. Lockout series circuit 60 includes a normally opened fast acting disconnect switch 300, actuated by solenoid 300–s. Solenoid 300–s is series connected to energizing source terminals 110, 111 through a device 302 generally referred to as a fault responsive switch in FIGURE 1, and more fully shown in FIGURE 2. Fault responsive switch 302 may include one or more system fault sensing inputs shown generally as 304, 306 which operatively control fault responsive switch 302 to complete the actuating circuit of solenoid 300–s. As will subsequently be discussed in conjunction with FIGURE 2, fault responsive switch 302 may be operated by such fault conditions as: a serious current unbalance within the capacitor bank overload during the bypass reset operation, or a prolonged flow of spark gap current. A switch 308 is also shown connected in parallel across fault responsive switch 302. Switch 308 may be manually operable or operable by remote control to permit removal of the capacitor bank.

Reference is now made to FIGURE 2 which diagrammatically illustrates a capacitor bank protective arrangement located at one phase of a high voltage transmission line, and wherein like numerals have been used to indicate those components previously designated in FIGURE 1. Capacitor bank 20 is seen to comprise a plurality of individual capacitor racks 20–A . . . 20–J, connected in a series parallel relationship. Line 10, 10' may typically be the main transmission line of a 230 kv. system, which would accordingly require a considerable number of individual capacitor units to provide the appropriate amount of neutralizing capacitive reactance. For increased economy and reduced space requirement, it has been found preferable to form the individual capacitor racks of primarily 100 kvar. capacitors, such as the 4160 volt units shown in FIGURES 5, 5A.

For increased capacitor protection, capacitor bank 20 preferably includes appropriate current unbalance sensers 61 responsive to a serious unbalance condition between the lines 22, 24. Also, one or more of the capacitor racks, such as 20–F, includes thermally responsive switch means 26–1, 26–2. As will be subsequently discussed, the outputs 61–1, 61–2 of the current unbalance senser and 26–1 and 26–2 of the thermal device are operatively interconnected to the protective arrangement for removing the capacitor bank from line 10–10' under such conditions which may not have resulted in operation of the main spark gap 30. Main spark gap 30 may be of the general type discussed in aforementioned patent application Serial No. 234,770, and includes main gaps 31, precision gap 32, resistors 33 and capacitors 34 to provide rapidly triggered and accurate break-down. Similarly, back-up spark gap 35 includes main gap 31', precision gap 32', with resistor 38 interconnecting precision spark gap terminals 38', 38" to common input terminal 39. Terminal 42 of spark gap 30 is connected to common terminal 44 of switch means 100, 200, placing normally open switch 100 being in shunt across spark gap 30, and said shunt arrangement being in series with normally closed switch means 200, across the capacitor bank terminals 39, 43. Back-up spark gap 35, which is calibrated to arc at a higher over-voltage value than spark gap 30, is placed across capacitor bank terminals 39, 43.

The control system energizing potential appearing between terminals 110, 111 is preferably obtained from transmission line 10–10', such as in the manner which is the subject of U.S. patent application (EP–29) Serial No. 259,181 entitled, "Constant Voltage Source for Operation of Series Capacitor Bank Protective Equipment," filed February 18, 1963, in the names of M. K. Price and B. J. Gilson, and assigned to the assignee of the instant invention. Such a voltage source is provided by saturable core transformer 112 and low pass filter 114 constructed to maintain a comparatively constant A.C. voltage between output terminals 110, 111 under widely varying conditions of line load current. As for example, the constant voltage source arrangement set forth in the aforementioned copending U.S. Patent application Serial No. 259,181 maintains the output voltage variation between 70 and 140 volts corresponding to line current variation from 50 to 6,000 amperes. This arrangement preferably avoids both the necessity of an auxiliary power source separate and distinct from the main power source, and the considerable expense of a potential transformer which would otherwise be required to go from the 230 kv. main line to a nominal 110-volt control circuit voltage. This advantageously permits all of the auxiliary equipment required to operate for the protection of the capacitor bank to be maintained at the platform level.

A suitable tap-off device 12 is provided along the line 10–10' to provide a current flow through series path 14 proportionally related to line load. Circuit 14 includes output terminals 16, 18 which supply the input signal 352 to the fast acting overload release circuitry generally shown as 350. Circuit 14 is also shown as including a number of relays 304–1, 304–2, 304–3 connected to time delay relays appropriately designed to pick up responsive to the existence of predetermined moderate overload conditions for prolonged periods of time.

The solenoid actuating circuits of fast acting protective system switches 100, 200, 300 are generally shown as 100–sc, 200–sc and 300–cs respectively. These circuits are parallel connected to potential source 110, 111, as for example via auto transformer 116. The control voltage available from the output of auto transformer 116 is presented to rectifying and voltage stabilizing circuitry of each of the solenoid actuating circuits to provide a constant source of D.C. potential. This circuitry includes bridge rectifier 120, capacitor 121, zener diode 122 and resistor 123, as shown in the input of circuit 100–sc. Similarly, components 220–223 and 320–323 are shown included in circuits 200–sc and 300–sc. The potential source terminals 110, 111 are also presented to a control circuit arrangement generally shown as 400, which as will be subsequently discussed is operatively associated with the solenoid control circuits of the protective switching arrangement to afford capacitance bank protection responsive to a variety of system abnormalities.

*System operation*

Responsive to an excessive voltage condition above a certain predetermined level, main spark gap device 30 will rapidly fire, striking an arc therebetween to shunt remove capacitor bank 20 from the line. The flow of arc current is sensed by 37, thereby actuating relay solenoid 36–s. This causes the closing of contact 36–1, located in the disconnected switch actuating circuitry 100–sc. The closing of contacts 36–1 completes the actuating circuit for solenoid 100–s through the normally closed auxiliary contacts 100–3. Fast acting disconnect switch 100 is then closed to provide a shunt across main spark gap 30, thereby extinguishing the arc therein by diverting current through the lower impedance bypass path 50. The closing of disconnect switch 100 also serves to close auxiliary contacts 100–2 and open auxiliary contact 100–3. Disconnect switch 100 may also include other auxiliary contacts (not shown) to initiate the spring motor charging of its operating spring, and provide interphase signalling.

The closing of contacts 100–2 provides an energizing path for interrupter solenoid 200–s through normally closed auxiliary contact 200–1, and terminals 360, 326 of fast acting overload release 350. Terminals 360, 362 are operatively related to line condition to be rapidly closed upon the clearing up of the fault condition. Upon such closing of terminals 360, 362, solenoid 200–s will be energized. Fast acting interrupter switch 200 is then opened, serving to reinsert capacitor bank 20 in series relationship with the transmission line 10–10'. At this time main spark gap 30 will be removed from circuit operation by the open circuiting of its series path, and the shunt thereacross provided by still closed disconnect switch 100. The removal of main spark gap 30 places back-up spark gap 35 in operation to protect capacitor bank 20 should a fault re-occur during the reinsertion cycle, while permitting spark gap 30 to naturally dissipate its ionized gases.

Reference is now made to FIGURE 3, which illustrates the sequential timing of rapid capacitor reinsertion provided by the particular system shown to illustrate our invention. Time $T_0$ corresponds to the occurrence of the fault condition, and the substantially instantaneous firing of the spark gap device 30. Current sensor 37 and its operating relay 36 are of a standard commercial variety, operable to close contact 36–1 in a maximum period of one cycle from the occurrence of arc current, at which time ($T_1$) disconnect tripping solenoid 100–s is energized. Bypass disconnect switch 100, of a conventional design to safely withstand the high capacitor bank ratings, is operable within the present capabilities of the art to close within approximately three cycles from the energization of tripping solenoid 100–s. Thus, at $T_2$ approximately four cycles from the initiation of the fault condition, bypass circuit 50 is completed to extinguish the arc and short out spark gap 30. The line is protected by a suitable arrangement of circuit breakers (not shown) which, for most fault conditions, will remove the fault from main transmission line 10–10' within 4–5 cycles after $T_0$. The removal of the fault condition at $T_3$ is sensed by a fast acting overload release 350 which may be of the type constituting the subject matter of above-mentioned U.S. Patent application Serial No. 259,233. Overload release preferably operates within approximately ¾ of a cycle from $T_3$ to close the circuit gap between terminals 360, 362. At this time, $T_4$, solenoid 200–s of fast acting interrupter switch 200 is energized. Interrupter switch 200 may be operable within the present capabilities of the art to open its contacts within a maximum of four cycles from the energization of coil 200–s. At this time spark gap 30 may still have ionized gases therein. Thus, in accordance with our invention, the opening of interrupter switch will defeat the shunt circuit relationship of spark gap 30, with back-up spark gap 35 serving to protect capacitor bank 20 during the reinsertion cycle. Main spark gap 30 will so remain out of the circuit until disconnect switch 100 is then opened and interrupter switch 200 closed to return to the normal operating condition. This typically takes at least 6 seconds during which time substantially all the ionized gases will be naturally dissipated from main spark gap 30.

Referring again to FIGURE 2 the operation of other aspects of the particular system shown therein will now be considered.

The pickup of any of the moderate overload sensing relays 304–15, 304–25, or 305–35 closes its associated contact 304–1, 304–2 or 304–3 located in the general control circuitry shown as 400. The closing of any of such contacts energizes one of its associated time delayed relays 305–15, 305–25 or 305–35, closing associated contacts of the latter 305–1, 305–2 or 305–3 responsive to the moderate overload condition existing for predetermined time intervals. Contacts 305–1, 305–2 and 305–3 are in parallel relationship with respect to the contacts 26–1, 26–2, controlled by the output of the thermal device located within the capacitor bank. Hence, the existence of any one of a plurality of predetermined moderate overload conditions for a continuous interval, or of an excessive temperature condition within the capacitor bank 20 serves to energize relay coil 306 in series relationship with respect to the aforesaid parallel arrangement of contacts. The energization of relay 306 will close its contacts 306–1, 306–2, located in the general circuitry of 100–sc and 302, respectively.

Contact 306–1 is in series relationship with actuating solenoid 100–s, through auxiliary contact 300–2 (closed when dockout switch 300 is in its normally opened position) and auxiliary contacts 100–3 (closed when disconnect switch 100 is in its normally open position). Thus it is seen that the actuation of coil 306 responsive to the aforedescribed moderate overload or capacitor bank thermal conditions will serve to actuate bypass disconnect switch 100, providing that lockout switch 300 has not been closed and switch 100 has not already been actuated responsive to arc current.

Contact 306–2 is similarly in series relationship with actuating solenoid 300–s of the lockout switch through series connected contacts 300–1 (closed when lockout switch 300 is in its normally open position), 200–2 (closed when interrupter 200 has been operated to its opened position). Thus, the actuation of relay 306 will alternately actuate lockout switch 300 to close auxiliary bypass circuit 60 should the circuit fault condition occur subsequent to the sequential operation of switches 100 and 200, and before they have been reset to their original positions.

Lockout switch 300 may alternatively be energized by the closing of contacts 86–1 or 87–1. The closing of contacts 86–1 is governed by the operation of time delay relay 86 in the circuit of arc current sensing contact 36–2. Thus, current flow through the spark gap for an extended length of time will serve to close lockout switch 300, via time delay relay switch 86. Contacts 87–1 are closed by the actuation of relay 87. Relay 87 is in series relationship with contacts 61–1, 61–2 of the capacitor bank current unbalance sensers, and will be actuated responsive to a predetermined unbalance condition.

It is therefore seen that our invention provides an improved protective arrangement for the removal of a series capacitor bank in the event of a system fault and for the rapid reinsertion of the capacitor bank upon the clearing up of the fault condition with a back-up spark gap being utilized during the reinsertion cycle to permit ionized gases within the main spark gap to be naturally dissipated, thereby avoiding the necessity of a compressed air source at the protective system installation site.

Although we have described preferred embodiments of our novel invention, many variations and modifications will now be obvious to those skilled in the art, and we prefer therefore to be limited not by the specific disclosure herein but only by the appended claims.

The embodiments of the invention in which an exclusive privilege or property is claimed are defined as follows.

1. In an electrical distribution system, a series capacitor installation comprising a capacitor bank series connected to an alternating current line; a first and second spark gap means in shunt circuit relationship with respect to said capacitor bank, each adapted to break down and immediately become conducting when subjected to first and second instantaneous fault voltages, respectively, in excess of a predetermined level, of sufficient magnitude to damage said capacitor bank; a bypass series circuit in shunt circuit relationship with respect to said capacitor bank; said bypass series circuit including a first normally open switch means and a second normally closed switch means; each of said switch means quickly operable to its other position responsive to predetermined circuit conditions; the circuit connection of said first and second switch means in said normal position placing said first spark gap means in shunt circuit relationship with respect to said capacitor bank; first sensing means for sensing the conduction of said first spark gap means; said first sensing means operatively connected to said first switch means for operation thereof to its closed position responsive to said first spark gap means conducting whereby said bypass circuit is completed to extinguish the arc across said first spark gap means; second sensing means for sensing the clearing up of a line fault condition; said second sensing means, and means operatively responsive to the condition of said first switch means, operatively connected to said second switch means for operation thereof to its open position responsive to said first switch means being closed and the line fault condition being cleared up, whereby said bypass circuit is interrupted, reinserting said capacitor bank in said alternating current power line; the operation of said second switch means to said open position defeating said shunt circuit relationship of said first spark gap means across said capacitor bank, with said second spark gap means being in shunt circuit protective relationship with said capacitor bank, whereby the protective removal of said capacitor bank is transferred from said first spark gap means to said second spark gap means; means for automatically returning said first switch means to its open position and said second switch means to its closed position after a predetermined time interval has elapsed from the transfer of capacitor bank protection from said first spark gap means to said second spark gap means, whereby the capacitor bank protection is reverted to said first spark gap means.

2. In an electrical distribution system, a series capacitor installation comprising a capacitor bank series connected to an alternating current line; a first and second spark gap means in shunt circuit relationship with respect to said capacitor bank, each adapted to break down and immediately become conducting when subjected to first and second instantaneous fault voltages, respectively, in excess of a predetermined level, of sufficient magnitude to damage said capacitor bank; a bypass series circuit in shunt circuit relationship with respect to said capacitor bank; said bypass series circuit including a first normally open switch means and a second normally closed switch means; each of said switch means quickly operable to its other position responsive to predetermined circuit conditions; the circuit connection of said first and second switch means in said normal position, placing said first spark gap means in shunt circuit relationship with respect to said capacitor bank; first sensing means for sensing the conduction of said first spark gap means; said first sensing means operatively connected to said first switch means for operation thereof to its closed position responsive to said first spark gap means conducting whereby said bypass circuit is completed to extinguish the arc across said first spark gap means; second sensing means for sensing the clearing up of a line fault condition; said second sensing means, and means operatively responsive to the condition of said first switch means, operatively connected to said second switch means for operation thereof to its open position responsive to said first switch means being closed and the line fault condition being cleared up, whereby said bypass circuit is interrupted, reinserting said capacitor bank in said alternating current power line; the operation of said first switch means to said closed position providing a shorted condition across said first spark gap means; said shorted condition being maintained upon subsequent opening of said second switch means to interrupt the bypass series circuit across said capacitor bank, with said second spark gap means being in shunt circuit protective arrangement across said reinserted capacitor bank, whereby the protective removal of said capacitor bank is transferred from said first spark gap means to said second spark gap means; means for automatically returning said first switch means to its open position and said second switch means to its closed position after a predetermined time interval has elapsed from the transfer of capacitor bank protection from said first spark gap means to said second spark gap means, whereby the capacitor bank protection is reverted to said first spark gap means.

3. In an electrical distribution system, a series capacitor installation comprising a capacitor bank series connected to an alternating current line; a first and second spark gap means in shunt circuit relationship with respect to said capacitor bank, each adapted to break down and immediately become conducting when subjected to first and second instantaneous fault voltages, respectively, in excess of a predetermined level, of sufficient magnitude to damage said capacitor bank; a bypass series circuit in shunt circuit relationship with respect to said capacitor bank; said bypass series circuit including a first normally open switch means and a second normally closed switch means; each of said switch means quickly operable to its other position responsive to predetermined circuit conditions; the circuit connection of said first and second switch means in said normal position placing said first spark gap means in shunt circuit relationship with respect to said capacitor bank; first sensing means for sensing the conduction of said first spark gap means; said first sensing means operatively connected to said first switch means for operation thereof to its closed position responsive to said first spark gap means conducting whereby said bypass circuit is completed to extinguish the arc across said first spark gap means; second sensing means for sensing the clearing up of a line fault condition; said second sensing means, and means operatively responsive to the condition of said first switch means, operatively connected to said second switch means for operation thereof to its open position responsive to said first switch means being closed and a predetermined fault condition being cleared up, whereby said bypass circuit is interrupted, reinserting said capacitor bank in said alternating current power line; said first and second switch means having first and second terminals respectively; said first terminals circuit connected to the respective end terminals of said capacitor bank; said second terminals connected to each other to form a common junction; said first spark gap means being connected between said first switch means first terminal and said common junction; said second spark gap means also being connected between said capacitor bank end terminals; the operation of said first switch means to said closed position providing a shorted condition across said first spark gap means; said shorted condition being maintained upon subsequent opening of said second switch means to interrupt the bypass series circuit across said capacitor bank, with said second spark gap means being in shunt circuit protective arrangement across said reinserted capacitor bank, whereby the protective removal of said capacitor bank is transferred from said first spark gap means to said second spark gap means; means for automatically returning said first switch means to its open position and said second switch means to its closed position after a predetermined time interval has elapsed from the transfer of capacitor bank protection from said first spark gap means to said second spark gap means, whereby the capacitor bank protection is reverted to said first spark gap means.

4. In an electrical distribution system, a series capacitor installation comprising a capacitor bank series connected to an alternating current line; a first and second spark gap means in shunt circuit relationship with respect to said capacitor bank, each adapted to break down and immediately become conducting when subjected to first and second instantaneous fault voltages, respectively, in excess of a predetermined level, of sufficient magnitude to damage said capacitor bank; a bypass series circuit in shunt circuit relationship with respect to said capacitor bank; said bypass series circuit including a first normally open switch means and a second normally closed switch means; each of said switch means quickly operable to its other position responsive to predetermined circuit conditions; the circuit connection of said first and second switch means in said normal position placing said first spark gap means in shunt circuit relationship with respect to said capacitor bank; first sensing means for sensing the conduction of said first spark gap means; said first sensing means operatively connected to said first switch means for operation thereof to its closed position responsive to said first spark gap means conducting whereby said bypass circuit is completed to extinguish the arc across said first spark gap means; second sensing means for sensing the clearing up of a line fault condition; said second sensing means, and means operatively responsive to the condition of said first switch means, operatively connected to said second switch means for operation thereof to its open position responsive to said first switch means being closed and a predetermined fault condition being cleared up, whereby said bypass circuit is interrupted, reinserting said capacitor bank in said alternating current power line; said first and second switch means having first and second terminals respectively; said first terminals circuit connected to the respective end terminals of said capacitor bank; said second terminals connected to each other to form a common junction; said first spark gap means being connected between said first switch means first terminal and said common junction; said second spark gap means also being connected between said capacitor bank end terminals; the operation of said second switch means to said open position defeating said shunt circuit relationship of said first spark gap means across said capacitor bank, with said second spark gap means being in shunt circuit protective relationship with said capacitor bank, whereby the protective removal of said capacitor bank is transferred from said first spark gap means to said second spark gap means; means for automatically returning said first switch means to its open position and said second switch means to its closed position after a predetermined time interval has elapsed from the transfer of capacitor bank protection from said first spark gap means to said second spark gap means, whereby the capacitor bank protection is reverted to said first spark gap means.

5. In an electrical distribution system, a series capacitor installation comprising a capacitor bank series connected to an alternating current line; first and second spark gap means, each adapted to break-down and become conductive responsive to a predetermined fault condition; circuit means for initially placing said first spark gap means in shunt circuit relationship with respect to said capacitor bank; first sensing means for sensing the conduction of said first spark gap means; said first sensing means operatively connected to first switch means for combinedly providing a first shunt path across said capacitor bank and a second shunt path across said first spark gap means responsive to the conduction of said first spark gap means; said first switch means serving to extinguish the arc across said first spark gap means; second sensing means for sensing the clearing up of a line fault condition; said second sensing means, and means operatively responsive to the condition of said first switch means, operatively connected to second switch means for defeating said first shunt path responsive to the clearing up of the line fault condition, and reinserting said capacitor bank in said alternating current line; said defeat of said first shunt path ineffective to defeat said second shunt path, whereby said first spark gap means remains shorted, with said capacitor bank being reinserted in said alternating current line; said second spark gap means circuit connected in shunt circuit relationship across said capacitor bank, and operable to protect said reinserted capacitor bank during the maintenance of said second shunt path by said first switch means; means for automatically returning said first and second switch means to their normal positions after a predetermined time interval has elapsed from the transfer of the shunt circuit capacitor bank relationship from said first spark gap means to said second spark gap means, whereby the capacitor bank protection is reverted to said first spark gap means.

6. In an electrical distribution system, a series capacitor installation comprising a capacitor bank series connected to an alternating current line; first and second spark gap means; each adapted to break-down and become conductive responsive to a predetermined fault condition; circuit means for initially placing said first spark gap means in shunt circuit relationship with respect to said capacitor bank; first switch means responsive to the conduction of said first spark gap means, combinedly providing a first shunt path across said capacitor bank and a second shunt path across said first spark gap means; said first switch means serving to extinguish the arc across said first spark gap means; second sensing means for sensing the clearing up of a line fault condition; said second sensing means, and means operatively responsive to the condition of said first switch means, operatively connected to second switch means for defeating said first shunt path responsive to the clearing up of the line fault condition, and reinserting said capacitor bank in said alternating current line; said circuit means for placing said first spark gap in shunt circuit relationship across said capacitor bank including said second switch means, the defeat of said first shunt path by said second switch means serving to open circuit the shunt relationship of said first spark gap means across said capacitor bank; said second spark gap means in circuit relationship across said capacitor bank and operable to protect said reinserted capacitor bank during said open circuiting of said first spark gap means from in shunt relationship across said capacitor bank; means for automatically returning said first and second switch means to their normal positions after a predetermined time interval has elapsed from the transfer of the shunt of the circuit capacitor bank relationship from said first spark gap means to said second spark gap means, whereby the capacitor bank protection is reverted to said first spark gap means.

7. In an electrical distribution system, a series capacitor installation comprising a capacitor bank series connected to an alternating current line; first and second spark gap means, each adapted to break-down and become conductive responsive to a predetermined fault condition; circuit means for initially placing said first spark gap means in shunt circuit relationship with respect to said capacitor bank; first sensing means for sensing the conduction of said first spark gap means; said first sensing means operatively connected to first switch means for combinedly providing a first shunt path across said capacitor bank and a second shunt path across said first spark gap means responsive to the conduction of said first spark gap means; said first switch means serving to extinguish the arc across said first spark gap means; second sensing means for sensing the clearing up of a line fault condition; said second sensing means, and means operatively responsive to the condition of said first switch means, operatively connected to second switch means for defeating said first shunt path responsive to the clearing up of the line fault condition, and reinserting said capacitor bank in said alternating current line; said first and second switch means having first and second terminals respectively; said first terminals circuit connected to the respective end terminals of said capacitor bank; said second terminals connected to each other to form a common junction; said first spark gap means being connected between said first switch means first terminal and said common junction; said second spark gap means also being connected between said capacitor bank end terminals; said defeat of said first shunt path ineffective to defeat said second shunt path, whereby said first spark means remains shorted, with said capacitor bank being reinserted in said alternating current line; said second spark gap means circuit connected in shunt circuit relationship across said capacitor bank, and operable to protect said reinserted capacitor bank during the maintenance of said second shunt path by said first switch means; means for automatically returning said first and second switch means to their normal positions after a predetermined time interval has elapsed from the transfer of the shunt circuit capacitor bank relationship from said first spark gap means to said second spark gap means, whereby the capacitor bank protection is reverted to said first spark gap means.

8. In an electrical distribution system, as set forth in claim 7, said first and second switch means having first and second terminals respectively; said first terminals circuit connected to the respective end terminals of said capacitor bank; said second terminals connected to each other to form a common junction; said first spark gap means being connected between said first switch means first terminal and said common junction; said second spark gap means also being connected between said capacitor bank end terminals.

9. In an electrical distribution system, as set forth in claim 1:
said predetermined time interval of a sufficient extent to permit natural dissipation of ionized gases from within said previously conducting first spark gap means.

10. In an electrical distribution system, as set forth in claim 5:
said predetermined time interval of a sufficient extent to permit natural dissipation of ionized gases from within said previously conducting first spark gap means.

11. In an electrical distribution system as set forth in claim 1, further including:
third sensing means for sensing the presence of a fault condition other than one of said first and second instantaneous voltages or line fault condition;
said third sensing means operatively connected to a third switch means, said third switch means circuit connected to said capacitor bank for removal of the capacitor bank from said alternating current power line responsive to the presence of said other fault condition.

12. In an electrical distribution system as set forth in claim 3, further including,
third sensing means for sensing the presence of a fault condition other than one of said first and second instantaneous voltages or line fault condition; said third sensing means operatively connected to a third switch means, said third switch means circuit connected to said capacitor bank for removal of the capacitor bank from said alternating current power line responsive to the presence of said other fault condition;
said third switch means being normally open and operated by means responsive to said third sensing means to a closed position; said switch means having first and second contacts connected to the respective end terminals of said capacitor bank, such that said capacitor bank is shorted by said third switch means upon operation thereof to its closed position.

13. In an electrical distribution system, as set forth in claim 5, further including:
third sensing means for sensing the presence of a fault condition other than one of said first and second instantaneous voltages or line fault condition; said third sensing means operatively connected to a third switch means, said third switch means circuit connected to said capacitor bank for removal of the capacitor bank from said alternating current power line responsive to the presence of said other fault condition.

14. In an electrical distribution system as set forth in claim 7, further including:
third sensing means for sensing the presence of a fault condition other than one of said first and second instantaneous voltages or line fault condition; said third sensing means operatively connected to a third switch means; said third switch means circuit connected to said capacitor bank for removal of the capacitor bank from said alternating current power line responsive to the presence of said other fault condition; said third switch means being normally open and operated by means responsive to said third sensing means to a closed position; said switch means having first and second contacts connected to the respective end terminals of said capacitor bank, such that said capacitor bank is shorted by said third switch means upon operation thereof to its closed position.

References Cited by the Examiner

FOREIGN PATENTS 928,185  3/1955  Germany.

STEPHEN W. CAPELLI, *Primary Examiner.*

SAMUEL BERNSTEIN, *Examiner.*

R. V. LUPO, *Assistant Examiner.*